(12) United States Patent
Ye et al.

(10) Patent No.: US 7,408,755 B1
(45) Date of Patent: Aug. 5, 2008

(54) ADVANCED INRUSH/TRANSIENT CURRENT LIMIT AND OVERLOAD/SHORT CIRCUIT PROTECTION METHOD AND APPARATUS FOR DC VOLTAGE POWER SUPPLY

(75) Inventors: Yang Ye, Mississauga (CA); Qihua Z. Zhao, Mississauga (CA); Daming Ma, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/761,884

(22) Filed: Jun. 12, 2007

(51) Int. Cl.
H02H 3/08 (2006.01)
H02H 9/02 (2006.01)
H02H 9/08 (2006.01)

(52) U.S. Cl. .................. 361/93.1; 361/93.7; 361/93.9

(58) Field of Classification Search ............. 361/93.1, 361/93.7, 93.9
See application file for complete search history.

(56) References Cited

U.S. PATENT DOCUMENTS

| | | | |
|---|---|---|---|
| 3,201,680 A | 8/1965 | Ross | |
| 3,209,205 A | 9/1965 | Olson | |
| 3,317,817 A | 5/1967 | Gershen | |
| 3,654,518 A | 4/1972 | Phelps et al. | |
| 3,703,679 A | 11/1972 | Heidt | |
| 3,723,774 A | 3/1973 | Rogers | |
| 3,748,569 A | 7/1973 | Frank et al. | |
| 3,753,078 A | 8/1973 | Hedel | |
| 3,851,218 A | 11/1974 | York | |
| 3,914,667 A | 10/1975 | Waldron | |
| 4,202,023 A | 5/1980 | Sears et al. | |
| 4,528,608 A | 7/1985 | Andersson et al. | |
| 4,638,396 A | 1/1987 | Mukli et al. | |
| 4,891,728 A | 1/1990 | Preis et al. | |
| RE33,941 E | 5/1992 | Lorincz et al. | |
| 5,469,002 A | 11/1995 | Garrett | |
| 5,587,649 A | 12/1996 | Garrett | |
| 6,108,183 A * | 8/2000 | Beene | 361/93.8 |
| 6,184,669 B1 | 2/2001 | Matsuo | |
| 6,307,726 B1 * | 10/2001 | Marshall et al. | 361/93.9 |
| 6,687,106 B1 | 2/2004 | Tanaka et al. | |
| 6,781,502 B1 | 8/2004 | Robb | |
| 2005/0052224 A1 * | 3/2005 | Yang et al. | 327/543 |
| 2006/0158810 A1 | 7/2006 | Tamosaitis | |
| 2007/0014066 A1 | 1/2007 | Ye | |

* cited by examiner

Primary Examiner—Michael J Sherry
Assistant Examiner—Dharti H Patel
(74) Attorney, Agent, or Firm—Oral Caglar, Esq.

(57) ABSTRACT

The present invention provides a single circuit that may have multiple protection functions for a DC voltage power supply. The present invention may include separate circuit modules that are employed individually, or in various combinations. These separate circuit modules include: a temperature and input voltage variation compensated current limit circuit; an inrush and transient current limit combined with an overload and short circuit protection circuit; and a self adaptive short circuit turn-off timing circuit.

15 Claims, 9 Drawing Sheets

ADVANCED INRUSH/TRANSIENT CURRENT LIMIT AND OVERLOAD/SHORT CIRCUIT PROTECTION METHOD AND APPARATUS FOR DC VOLTAGE POWER SUPPLY

BACKGROUND OF THE INVENTION

The present invention relates to DC voltage power supplies and more particularly to inrush/transient current limiting and overload/short circuit protection for DC voltage power supplies.

Many applications that utilize DC voltage encounter various operating conditions that could potentially damage electrical system components. Providing protection against damage during these operating conditions can pose difficult challenges for DC voltage power supplies. In some applications, such as aerospace systems, operating situations that can cause damage include inrush currents, transient currents, circuit overloads and short circuits. Inrush currents may consist of a momentary high current that occurs when the power supply is first turned on. Transient current increases may occur due to brief changes in the input voltage. Circuit overload may be caused by various malfunctions occurring in the loads, and short circuits may occur when feeder lines are shorted.

Figure 1:
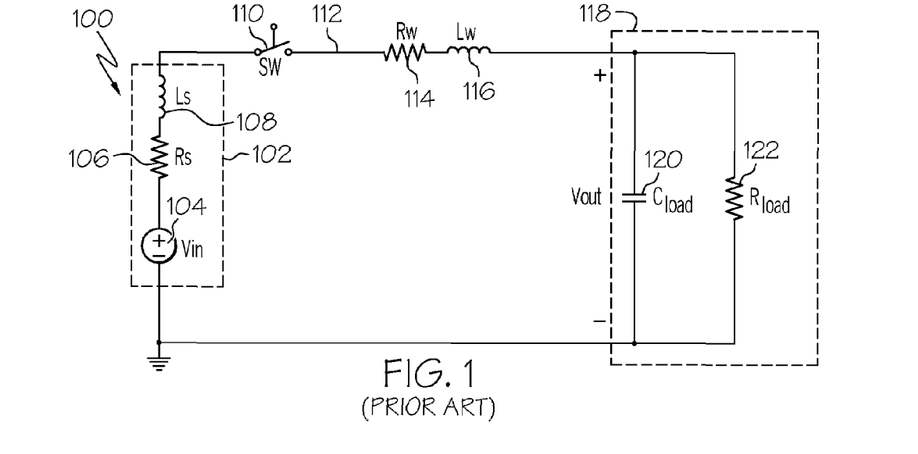
FIG. 1 is a circuit diagram of a DC power system in accordance with the prior art.

FIG. 1 shows a typical DC power system 100 in accordance with the prior art. A DC power source 102 includes a DC source Vin 104, a source resistance Rs 106 and source inductance Ls 108. In an exemplary application, such as avionics, DC power source 102 may be either 28V or 270 V. The DC power source 102 may be connected to a switch 110 and to wiring 112, which has wiring resistance Rw 114 and wiring inductance Lw 116. A load 118 may be connected across the positive and negative terminals of the DC power source 102. Load 118 may include a load capacitance 120 and a load resistance 122. The switch 110 may be used to turn on and off DC power to the load 118 and may comprise, for example, a circuit breaker, a relay or an electronic switch.

In operation, the DC voltage Vin produced by the DC power source 102, may vary widely over short periods of time. These transient variations may be due to a number of occurrences. For example, if DC source 104 is a battery, DC voltage variations may be the result of the charging and discharging of the battery. Load capacitor 120 may provide stabilization of load voltage during these variations in Vin. When the switch 110 is turned on, the source voltage Vin may charge the load capacitor 120 through the DC source 102 and wiring 112 impedance. Since $C_{load}$ is high, and usually Rs, Ls, Rw, and Lw are all small, the inrush current may be relatively large. A large inrush current may be harmful to the DC power system 100 by stressing the power source and the switch and also by producing electromagnetic interference (EMI).

Inrush current occurs not only at power on, but can occur due to the aforementioned transient variations in input voltage Vin. For example, when a step change is applied in the input voltage from minimum to maximum voltage, the induced inrush current can be large according to the slew rate. Hence there is a need to limit inrush currents and transient currents.

Short circuit protection is also needed for DC power systems. In the event of a short circuit condition a switch, such as switch 110, should be turned off fast enough before any damage can occur. At the same time, there should not be any nuisance trip of switch 110 under normal operating conditions. In avionics systems it is desirable for a circuit providing such short circuit protection to be relatively simple, low cost, and to be able to operate over a wide input voltage range and a wide temperature range.

Figure 2:
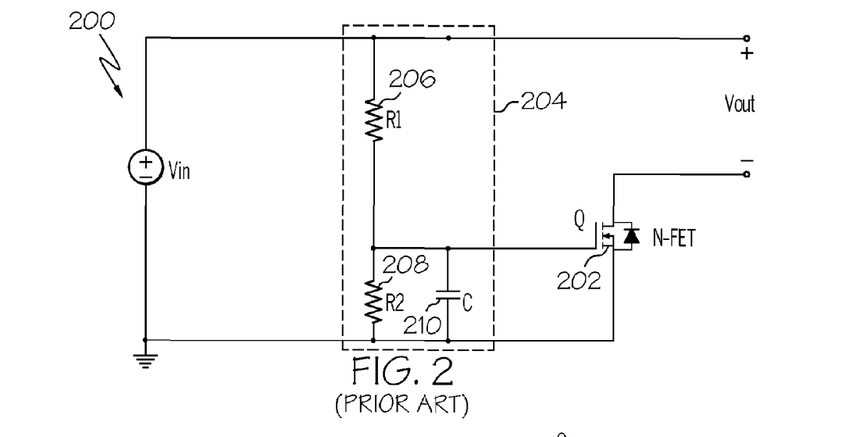
FIG. 2 is a circuit diagram of a DC power system having a low side rise time delay circuit in accordance with the prior art.
Figure 3:
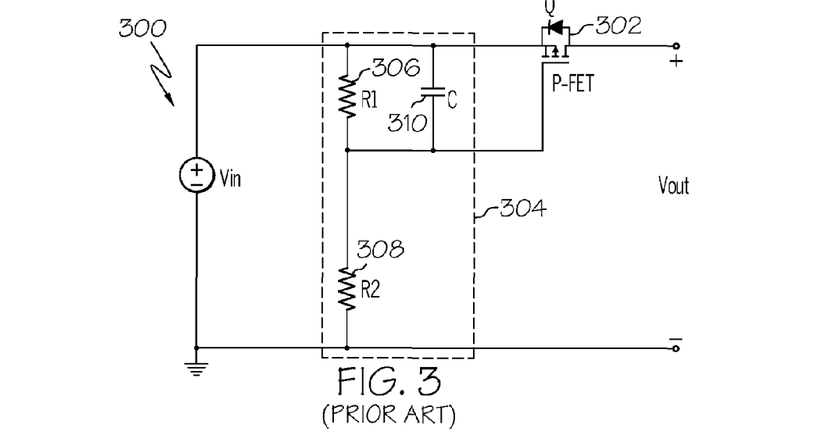
FIG. 3 is a circuit diagram of a DC power system having a high side rise time delay circuit in accordance with the prior art.

FIGS. 2 and 3 show circuits 200 and 300 respectively, in accordance with the prior art. Circuits 200 and 300 each have simple R-C circuits that are used to extend the rise time of the load voltage and thereby limit inrush current. In FIG. 2 a switch 202 may be placed on the low side along with an R-C circuit 204 that may include resistors 206 and 208 and a capacitor 210. During power up the capacitor 210 voltage may be charged slowly, which will turn on switch 202 gradually from off to on. During power up, switch 202 may be going through a linear operation area for a pre-determined period of time defined by the parameters of resistors 206 and 208 and capacitor 210. As a result, the output voltage Vout of the circuit may increase with a relatively slow changing rate, which will limit the inrush current level.

FIG. 3 shows a circuit 300 that is similar to circuit 200 except that it may include a switch 302 placed on the high side. Circuit 300 may include an R-C circuit 304 having resistors 306 and 308 and a capacitor 310. Both circuits 200 and circuit 300 may only be effective in limiting inrush current during power up and may not provide inrush protection for transient inrush currents.

Figure 4:
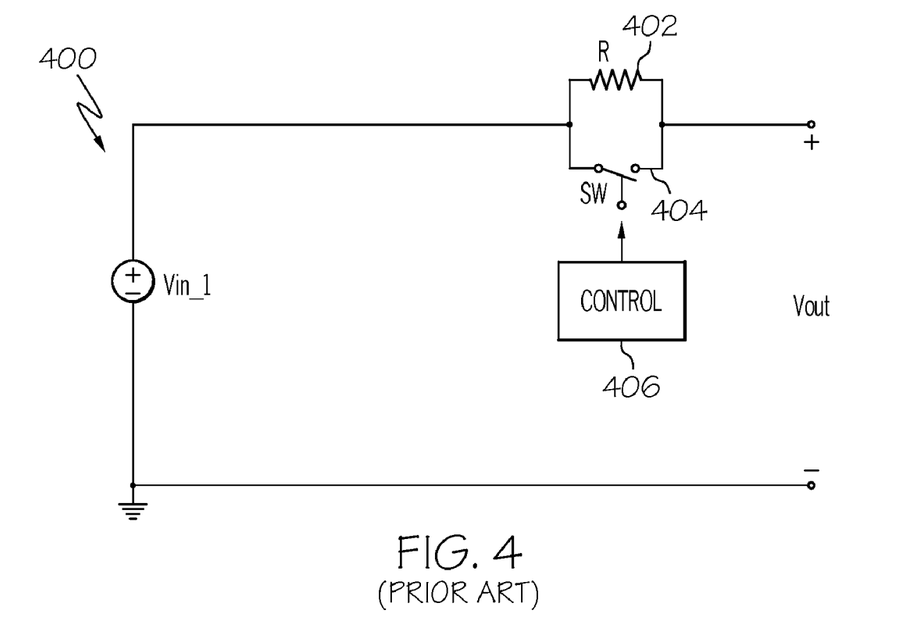
FIG. 4 is a circuit diagram of a DC power system having an inrush current limiting circuit in accordance with the prior art.

FIG. 4 shows a circuit 400 that may be commonly used for inrush current limit in accordance with the prior art. In circuit 400 the inrush current may be initially limited by a resistor 402. After a transient period, a switch 404 may be closed to short resistor 402 out of the current path. Control logic unit 406 may be used for switching control. Switch 404 may comprise contactor or electronic switches, for example, a metal oxide semiconductor field effect transistor (MOSFET), or insulated gate bipolar transistor (IGBT), etc. Where switch 404 is a contactor, the circuit 400 may be only useful for inrush current limit during power up and may not be able to achieve inrush current limit caused by input voltage transients after power on. Overload and short circuit protection functions also may not be achieved due to the slow response of contactor.

Where switch 404 is an electronic switch the circuit 400 may have fast dynamic response. However, in order to achieve transient current limit and overload/short-circuit protection functions, control circuit 406 will need to include complex driver circuitry and fast control logic, which will increase the circuit complexity, cost and circuit board area.

Figure 5:
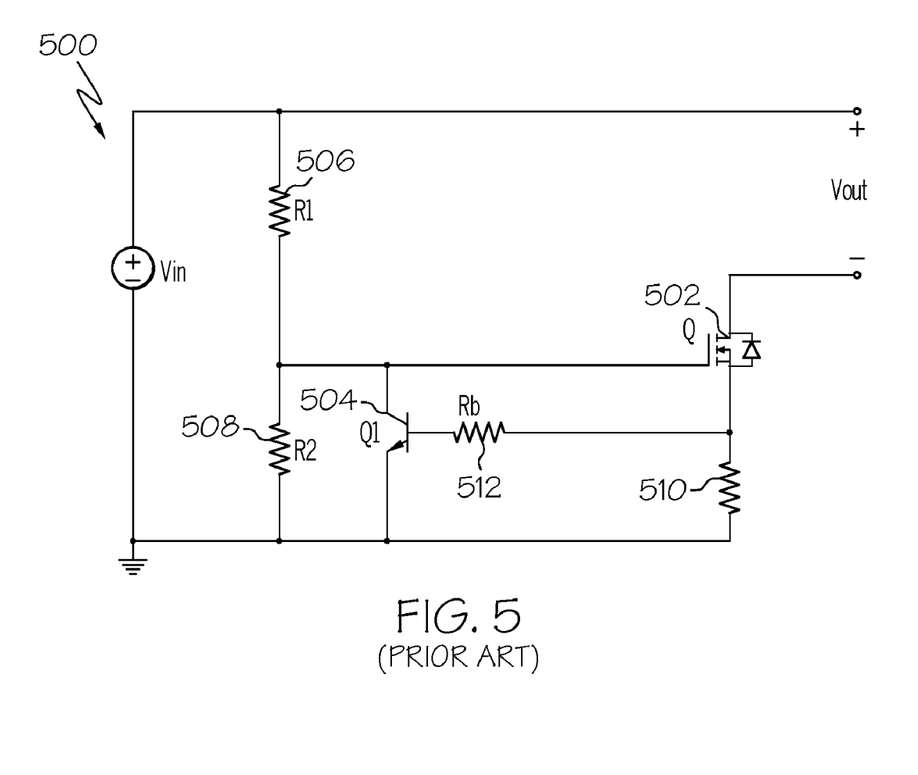
FIG. 5 is a circuit diagram of a DC power system having a MOSFET-based current limiting circuit in accordance with the prior art.

FIG. 5 shows a current limit circuit 500 in accordance with the prior art. Current limit circuit 500 may include MOSFET switch 502 and a transistor 504 having its collector connected to the gate of MOSFET switch 502. Resistor 506, 508, 510 and 512 may be connected as shown in FIG. 5. In operation, circuit 500 may have MOSFET switch 502 operating in the linear mode. When the load current reaches a predetermined limit setting, the transistor 504 may be on, which may pull down the gate voltage of MOSFET switch 502 so that the load current stays at the limit setting. The MOSFET switch 502 may be operating in linear mode, because the gate voltage is low, and both the drain current Id and the drain to source voltage Vds of MOSFET switch 502 are high.

The circuit 500 in FIG. 5 may limit any kind of inrush current, whether due to power up, or input voltage transient. However, the current limit level in this circuit is quite sensitive to environmental temperature and input voltage level. This is because the current limit level may be set by the transistor 504 base to emitter voltage Vbe. Unfortunately, Vbe changes with the environmental temperature. Collector current Ic of transistor 504 may also change if the input voltage varies. Hence, circuit 500 may not be suitable for applications having wide temperature and input voltage variations, such as aerospace applications. In addition, as with circuits 100, 200, 300 and 400, circuit 500 may not provide overload and short circuit protection functions.

As can be seen, there is a need for a circuit for DC voltage power supplies that can provide inrush current protection upon startup and during input transients. There is also a need for such a circuit that can provide fast short circuit protection and overload protection. There is also a need for a circuit with the aforementioned features that is relatively simple, low cost, and able to operate over a wide input voltage range and a wide temperature range.

SUMMARY OF THE INVENTION

In one aspect of the present invention, a DC voltage power control circuit comprises: input terminals; output terminals; current limiting circuit operable to limit the amount of current delivered from the input terminals to the output terminals to a predetermined value, the operation of the current limiting circuit being temperature dependent; the current limiting circuit including a sensor for sensing when the current delivered to the output terminal reaches a predetermined threshold; and compensation circuit coupled to one of the output terminals and to the current limiting circuit, the compensation circuit controlling the current limiting circuit in a manner that is temperature dependent, such that the temperature dependence of the current limiting circuit and the compensation circuit cancel each other out.

In another aspect of the present invention, a protection circuit for limiting the amount of electrical power delivered from a power source to a load comprises: input terminals; output terminals; first semiconductor switch coupled to one of the output terminals, and having a current limiting state, a non-current limiting state, and an off state; current limiting circuit for limiting the amount of current delivered from the input terminals to the output terminals to a predetermined value by controlling the first semiconductor switch; and short circuit protection circuit coupled to the first semiconductor switch, the short circuit protection circuit being coupled to and controlling the off state of the first semiconductor switch.

In a further aspect of the present invention, a DC voltage power supply comprises: input terminals; output terminals; first semiconductor switch coupled to one of the output terminals, the first semiconductor switch having a current limiting state, a non-current limiting state, and an off state; short circuit protection circuit coupled to and controlling the off state of the first semiconductor switch; the short circuit protection circuit including a timer circuit generating a signal after the first semiconductor switch has been in the current limiting state for a predetermined period of time; the short circuit protection circuit responding to the timer circuit signal by causing the first semiconductor switch to enter the off state; and short circuit turn-off timing circuit coupled to the short circuit protection circuit, the short circuit turn-off timing circuit causing the timer to speed up the timing of the generation of the signal in a short circuit condition.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be advantageously used in DC voltage power supplies where it is desirable to have one or more of the following features: inrush current limiting, transient current limiting, overload circuit protection and short circuit protection. It may be particularly advantageous in applications such as avionics, where it is desirable to minimize the volume and weight of the DC voltage power supply system.

Embodiments of the present invention may provide both inrush and transient current limiting as well as overload and short circuit protection in a single circuit. In the prior art, separate circuits were required to achieve these functions. Also, the present invention may provide temperature and input voltage compensated current limiting so that the change of the current limit value due to variations in ambient temperature and input voltage will be minimized. A simple temperature compensation circuit comprising a resistor and a diode may accomplish the temperature compensation. Prior art inrush current limiting circuits did not provide such a temperature compensation circuit, and hence, the current limit value could vary with temperature. Furthermore, the present invention provides self adaptive short circuit turn-off timing. Prior art short circuit protection circuits did not provide a self adaptive short circuit turn-off timing circuit.

An embodiment of the present invention provides a single circuit that may provide multiple protection functions for a DC voltage power supply. It will be appreciated that the present invention may include separate circuit modules that may be employed individually, or in various combinations in a DC voltage power supply. In particular, these circuit modules may include: a) a temperature and input voltage variation compensated current limit circuit; b) a combined inrush and transient current limit as well as an overload and short circuit protection circuit; and c) a self adaptive short circuit turn-off timing circuit.

Figure 6:
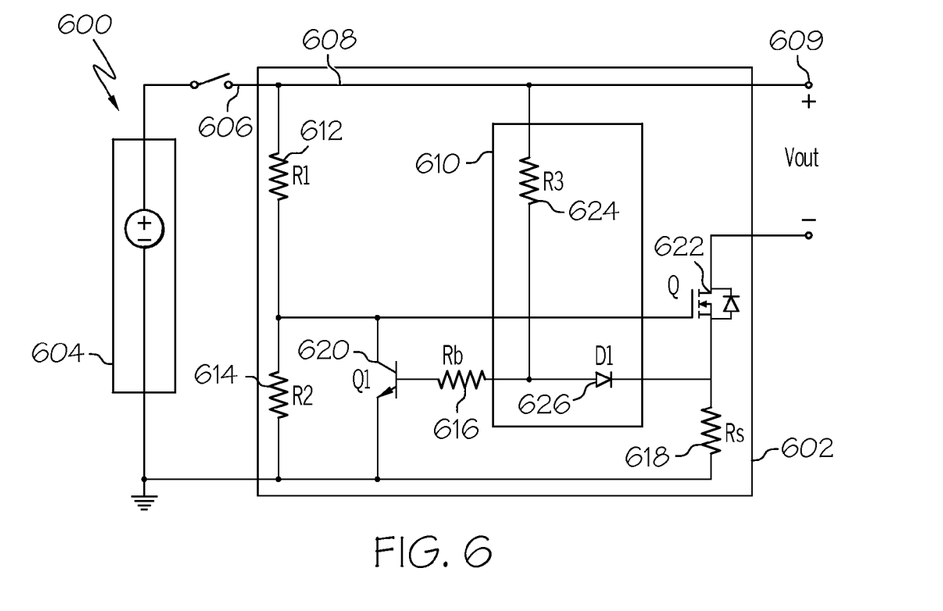
FIG. 6 is a circuit diagram of a DC power system having a temperature compensated current limit and a low side switch in accordance with an embodiment of the invention.

Referring to FIG. 6, a DC voltage power supply 600 is shown in accordance with an embodiment of the invention. In this embodiment, a current limit circuit 602 may provide temperature and input voltage variation current limiting. Power supply 600 may include a DC power source 604. In one exemplary application, such as avionics, the DC power source 604 may supply either 28 Volts or 270 Volts. The DC power source 604 may be connected to a switch 606, and to voltage output line 608, which may be connected to a positive output terminal 609. A current limit circuit 602 may have similar components as the current limit circuit 501 shown in FIG. 5, but with the addition of a temperature and input voltage compensation circuit 610. Hence, current limit circuit 602 may include resistors 612, 614, 616 and 618, as well as transistor 620 and MOSFET switch 622, which may be an N-FET switch, in a configuration similar to their corresponding components in FIG. 5.

The temperature and input voltage compensation circuit 610 may include a resistor 624 and a diode 626. Resistor 624 may be connected on one side to the anode of diode 626 and on the other side to the voltage output line 608. The cathode of diode 626 may be connected to the source of MOSFET switch 622 and the anode of diode 626 may also be connected to resistor 616. The forward voltage drop of the diode 626 must be less than the base-to-emitter voltage drop of the transistor 620 to ensure an achievable current limit. So the diode 626 should be a Schottky diode.

It will be appreciated by those skilled in the art that without the temperature and input voltage compensation circuit 610 the current limit value may be:

$$I_{lmt} = V_{be,Q1}/R_S,$$

where $V_{be}$ is the voltage across the base and emitter of transistor 620, and $R_S$ is the resistance of resistor 618. With the input voltage compensation circuit 610, the current limit value may become:

$$I_{lmt} = (V_{be,Q1} - V_{f,D1})/R_S,$$

where $V_{f,D1}$ is the forward voltage across diode 626. Since $V_{be}$ and $V_f$ are both p-n junctions, they may vary in the same trend as temperature varies. So the difference of the two can cancel out the effect of temperature variation on the current limit value.

Furthermore, the value of resistor 624 may set the bias current of diode 626, and the resistances of resistors 612 and 614 may set the bias current of transistor 620. Since both bias currents are taken from the input voltage, the effect of input voltage can also be cancelled out, if the bias currents are appropriately selected as will be appreciated by those skilled in the art.

Figure 7:
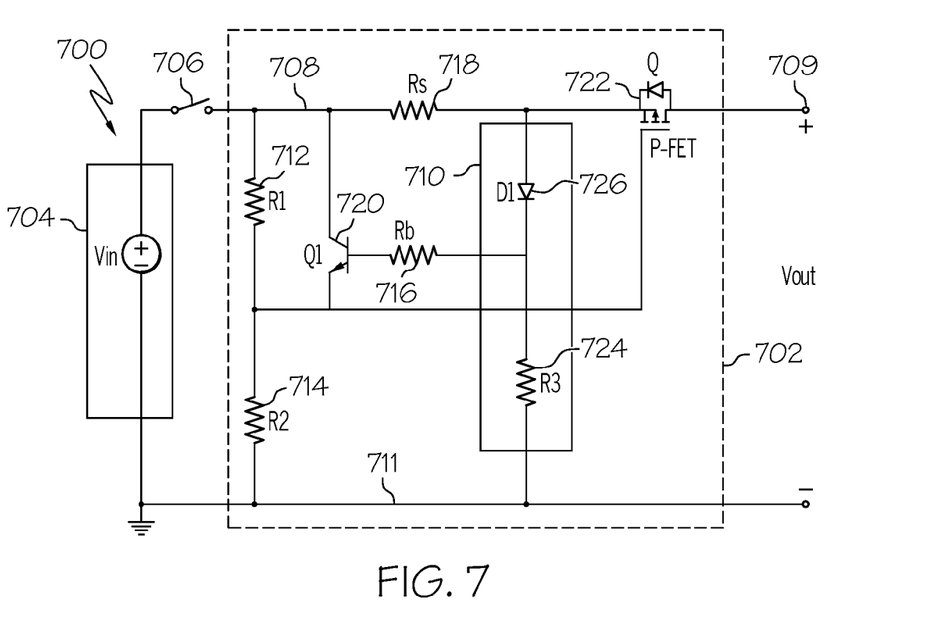
FIG. 7 is a circuit diagram of a DC power system having a temperature compensated current limit and a high side switch in accordance with an embodiment of the invention.

FIG. 7 shows a DC voltage power supply 700 in accordance with another embodiment of the invention. The DC voltage power supply 700 may be identical to DC voltage power supply 600 shown in FIG. 6 except that the MOSFET switch 622 is placed on the high side instead of the low side and MOSFET switch 622 is a P-FET switch, instead of an N-FET switch. In particular, DC voltage power supply 700 may include a DC power source 704 connected to a current limit circuit 702. In one exemplary application such as avionics, the DC power source 704 may supply either 28 Volts or 270 Volts. The DC power source 704 may be connected to a switch 706, which is connected through a resistor 718 to the source of a MOSFET switch 722, which may be a P-FET. MOSFET switch 722 may be connected at its drain to voltage output terminal 708. A current limit circuit 702 may include resistors 712, 714, 716 and 718, as well as a transistor 720.

The temperature and input voltage compensation circuit 710 may include a resistor 724 and a diode 726. Resistor 724 may be connected on one side to the cathode of diode 726 and on the other side to a negative voltage line 711. The anode of diode 726 may be connected to the source of MOSFET switch 722 and the anode of diode 726 may also be connected to resistor 716.

Figure 8:
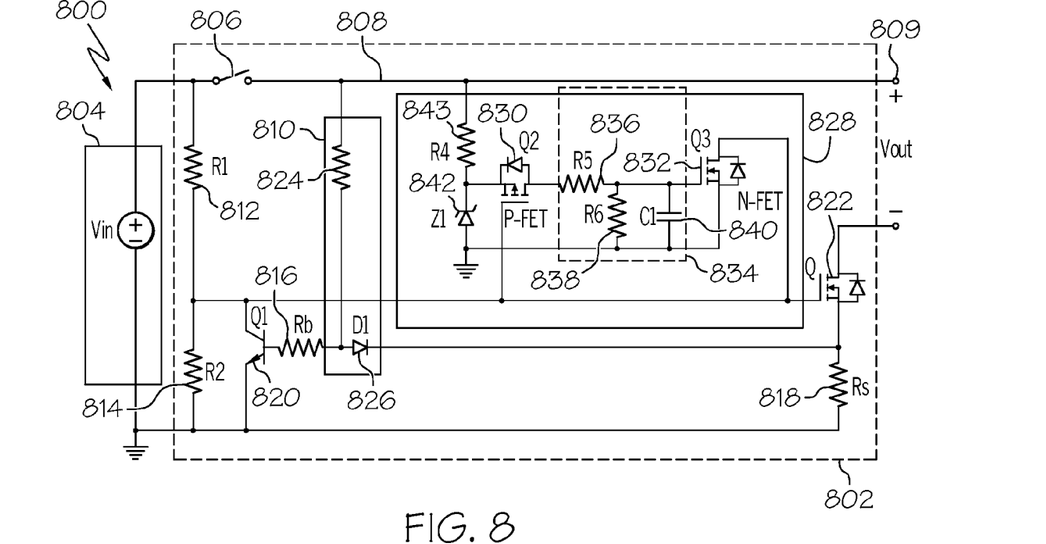
FIG. 8 is a circuit diagram of a DC power system having a combined inrush limit and short circuit protection circuit with a low side switch in accordance with an embodiment of the invention.

FIG. 8 shows a DC power supply 800, which may include all the components as DC power supply 600 in FIG. 6 with the addition of short circuit protection function. The general approach to short circuit protection of the present invention in DC power supply 800 may be to turn off the MOSFET switch completely if it stays in current limiting mode for a given period of time. To effectively protect against short circuit, the following requirements may be satisfied:

1. The timing circuit may be activated once the MOSFET enters into current limiting mode;
2. The timing may be set long enough to avoid nuisance trip for normal transient and power up, and short enough to protect against real short circuit or overload; and
3. Once the MOSFET is turned off, it may be latched.

The above requirements can be satisfied with the DC power supply circuit 800 shown in FIG. 8. In particular, DC power supply circuit 800 may include the same components as the DC power supply circuit 600 shown in FIG. 6 with the addition of a short circuit protection circuit 828. Hence, DC power supply circuit 800 may include a DC power source 804 connected to a current limit circuit 802. In one exemplary application, such as avionics, the DC power source 804 may supply either 28 Volts or 270 Volts. The DC power source 804 may be connected to a switch 806, and to voltage output line 808, which may be connected to a positive output terminal 809. A current limit circuit 802 may include resistors 812, 814, 816 and 818, as well as transistor 820 and MOSFET switch 822, which may be an N-FET switch, in a configuration similar to their corresponding components in FIG. 6.

The temperature and input voltage compensation circuit 810 may include a resistor 824 and a diode 826. Resistor 824 may be connected on one side to the anode of diode 826 and on the other side to the voltage output line 808. The cathode of diode 826 may be connected to the source of MOSFET switch 822 and the anode of diode 826 may also be connected to resistor 816.

The short circuit protection circuit 828 may include MOSFET switch 830, which may be a P-FET, and MOSFET switch 832, which may be an N-FET. When MOSFET switch 830 is on, the gate voltage of MOSFET switch 832 may start to be charged up from an R-C network 834 consisting of resistors 836 and 838 and capacitor 840. When MOSFET switch 830 is off, the gate voltage of MOSFET switch 832 may be discharged from resistor 838 and capacitor 840. A Zener diode 842 may have its cathode connected to the voltage output line 808 through resistor 843. The Zener diode 842 may be selected such that in normal operation, the voltage across Zener diode 842 Vz1 may always be lower than the gate voltage of MOSFET switch 822, which may be determined by the voltage divider of resistors 812 and 814. If necessary, in an alternative embodiment, another Zener diode (not shown) can be placed in parallel with resistor 814 to insure that the gate voltage of MOSFET switch 822 may be always higher than Vz1.

Whenever MOSFET switch 822 enters into current limiting mode, the gate voltage of MOSFET switch 822 may be reduced to a level close to its threshold voltage. Vz1 may be higher than the threshold voltage. Moreover, the difference between Vz1 and the threshold voltage may be high enough to insure that MOSFET switch 830 will be on. In this way, R-C network 834 may be activated as soon as MOSFET switch 822 is in current limiting mode. The time constant of R-C network 834 may be designed by selection of the resistance values of resistor 836 and 838 and capacitor 840, according to the particular transient requirements of the application, to avoid nuisance trip.

In case of an actual short circuit or overload, the voltage across capacitor 840 may be charged high enough to turn on MOSFET switch 832. Once MOSFET switch 832 is on, MOSFET switch 822 may be completely turned off. MOSFET switch 822 may be latched in the off mode because the gate of MOSFET switch 830 is shorted to ground to ensure that MOSFET switch 830 stays on. As a result, short circuit protection circuit 828 may meet the above-discussed requirements for short circuit protection.

Once MOSFET switch 822 is turned off, there may be two ways to reset the protection. One way may be to cycle the input power, by turning off and on switch 806. The other way to reset the protection may be to discharge Zener diode 842 using an external reset signal.

Figure 9:
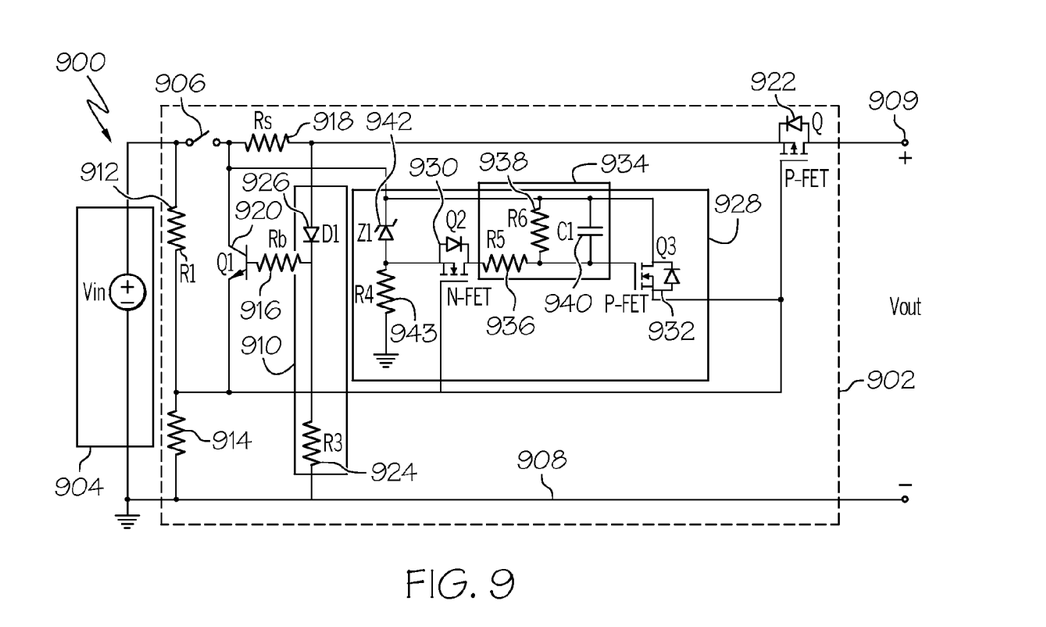
FIG. 9 is a circuit diagram of a DC power system having a combined inrush limit and short circuit protection circuit with a high side switch in accordance with an embodiment of the invention.

FIG. 9 shows a DC power supply circuit 900 which may be similar to the DC power supply circuit 800 shown in FIG. 8 except that the MOSFET switch 822 instead of being on the low side is on the high side of the DC power source. DC power supply circuit 900 may include a DC power source 904 connected to a protection circuit 902. The DC power source 904 may be connected to a switch 906, and to voltage output line 908, which may be connected to a positive output terminal 909. A current limit circuit 902 may include resistors 912, 914, 916 and 918, as well as transistor 920 and MOSFET switch 922, which may be an P-FET switch.

A temperature and input voltage compensation circuit 910 may include a resistor 924 and a diode 926. Resistor 924 may be connected on one side to the cathode of diode 926 and on the other side to the negative voltage line 908. The anode of diode 926 may be connected to the source of MOSFET switch 922 and the anode of diode 926 may also be connected to resistor 916.

The short circuit protection circuit 928 may include MOSFET switch 930, which may be an N-FET, and MOSFET switch 932, which may be a P-FET. When MOSFET switch 930 is on, the gate voltage of MOSFET switch 932 may start to be charged up from an R-C network 934 which may consist of resistors 936 and 938 and capacitor 940. When MOSFET switch 930 is off, the gate voltage of MOSFET switch 932 may be discharged from resistor 938 and capacitor 940. A Zener diode 942 may be selected such that in normal operation, the voltage across Zener diode 942 (Vz1) may be always lower than the gate voltage of MOSFET switch 922, which may be determined by the voltage divider of resistors 912 and 914. If necessary, in an alternative embodiment, another Zener diode (not shown) can be placed in parallel with resistor 914 to insure that the gate voltage of MOSFET switch 922 may be higher than Vz1.

An additional issue present in the DC power supply circuits 800 and 900 is that the timing to turn off the MOSFET switch 822, 922 in transient or short circuit situations may be a fixed value. This fixed value may be longer than normal transients. During power on or other transients, the voltage across these MOSFET switches may drop linearly as the load capacitor is charged with a constant current. If there is a short circuit at the load, the MOSFET switch 822, 922 may take all the input voltage and the maximum current limit at the same time, which greatly increases its stress level compared to the normal transient. To reduce the MOSFET stress level during short circuit, in accordance with the present invention, the turn off timing may be self adaptive to the condition. For normal transient, the turn off timing can be longer to avoid nuisance trip. For short circuit condition, the turn off timing should be faster to protect the MOSFET switch 822, 922. It may be preferable if the timing is adjustable automatically under different short circuit conditions.

One indication of the severity of the short circuit is the drain voltage of MOSFET switch 822, 922. When a short circuit happens, the power supply input current will be limited at a certain pre-defined level. For an overload condition, the drain voltage of MOSFET switch 822, 922 may be a portion of the input voltage. For a dead short, the drain voltage may be the total input voltage. Hence, in accordance with one embodiment of the invention, the drain voltage can be fed back to the timing circuit to accelerate the charging time.

Figure 10:
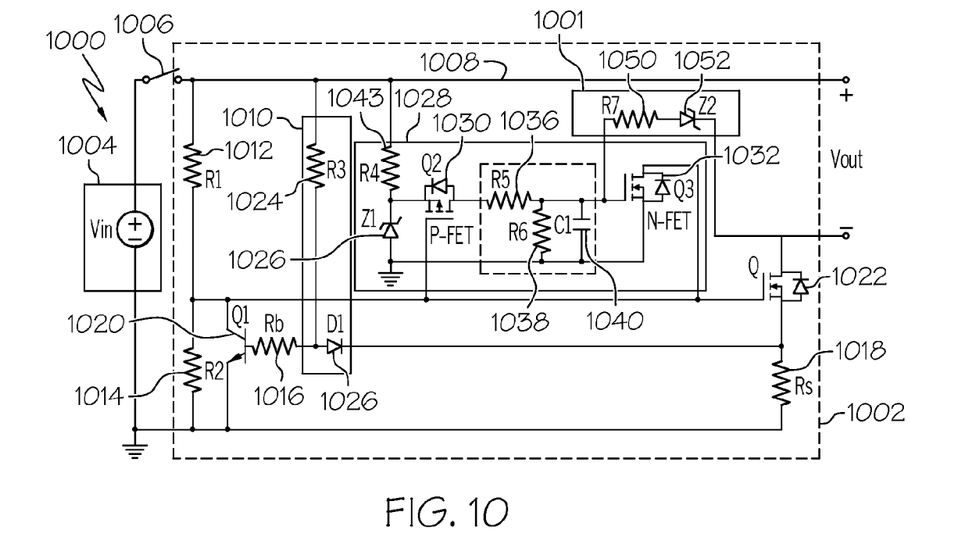
FIG. 10 is a circuit diagram of a DC power system having a short circuit protection circuit with adaptive timing and a low side switch in accordance with an embodiment of the invention.

In particular, FIG. 10 shows a DC power supply circuit 1000 which may include a self adaptive short circuit turn-off timing function. This function may be implemented by a short circuit turn-off timing circuit 1001. The DC power supply circuit 1000 shown in FIG. 10 may be identical to the DC power supply circuit 800 shown in FIG. 8 except for the addition of the short circuit turn-off timing circuit 1001. Hence, the DC power supply circuit 1000 may include a current limiting circuit 1002, a DC power source 1004, a switch 1006, a voltage output line 1008, a temperature and input voltage compensation circuit 1010, resistors 1012, 1014, 1016 and 1018, a transistor 1020, an N-FET MOSFET switch 1022, and a short circuit protection circuit 1028, each of which may be similar to the corresponding components shown in FIG. 8.

The short circuit turn-off timing circuit 1001 may include a resistor 1050 and a Zener diode 1052. Once the drain voltage of MOSFET switch 1022 is under certain voltage, the acceleration of the short circuit turn-off timing may not be required. Zener diode 1052 may be used to set such voltage. Resistor 1050 may be used to determine how much acceleration of the short circuit turn-off timing is required. If necessary, a protective Zener can be placed in parallel with capacitor 1040 to provide protection the gate of MOSFET switch 1032.

In case of a dead short, the turn-off time may be mainly determined by the timing from resistors 1050, 1038 and capacitor 1040. This turn-off time can be much faster than the normal charging time. For normal transients, the voltage at the drain of MOSFET switch 1022 may be reduced to less than the voltage of Zener diode 1052 quickly. Hence, the charging time may still be mainly determined by resistors 1036, 1038 and capacitor 1040. In this case, the stress level of MOSFET switch 1022 may be reduced significantly.

Figure 11:
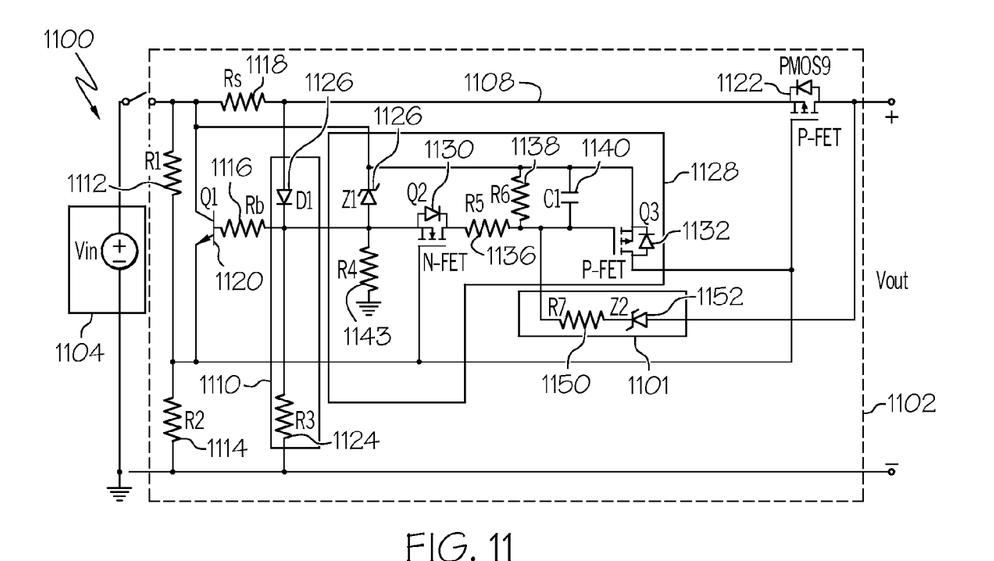
FIG. 11 is a circuit diagram of a DC power system having a short circuit protection circuit with adaptive timing and a high side switch in accordance with an embodiment of the invention.

FIG. 11 shows a DC power supply circuit 1100, which may be similar to the DC power supply circuit 1000 shown in FIG. 10, except that it includes a MOSFET 1102, which switch is a P-FET that may be located on the high side. In other words, DC power supply circuit 1100 may be similar to the DC power supply circuit 900 shown in FIG. 9 with the addition of a short circuit turn-off timing circuit 1101.

Figure 12:
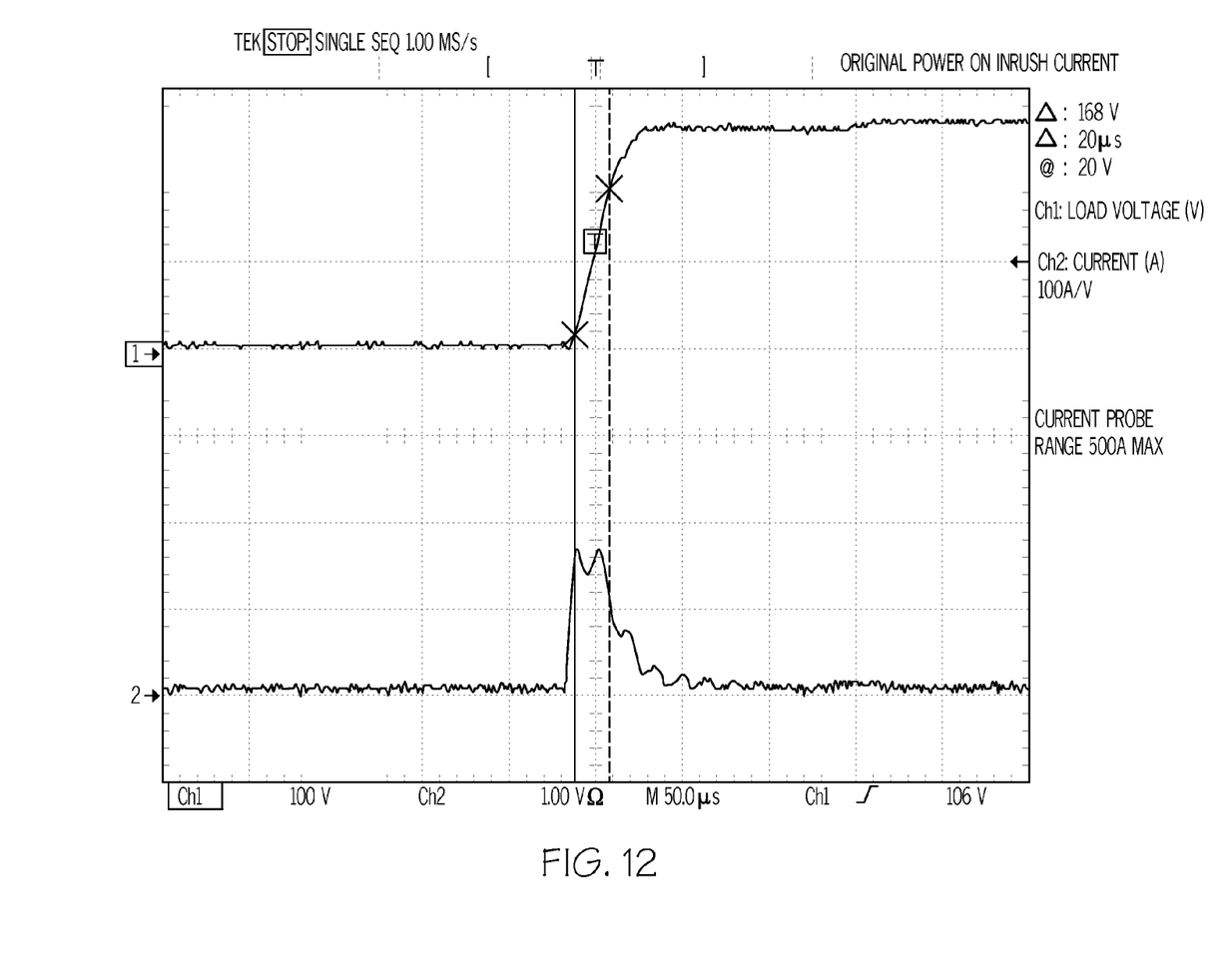
FIG. 12 is a graph of the inrush current performance of a DC power supply in accordance with the prior art.

FIG. 12 is a graph 1200 showing load voltage and inrush current at power-on without any inrush current limiting. In particular, the graph 1200 shows the inrush current 1202 and the load voltage 1204 for a DC power supply circuit without an inrush current limiting circuit, which may be a 270V system, where the input voltage range may be about 180V to 350V and the temperature range may be about −40° C. to 125° C. Graph 1200 shows that at power-on, the load voltage 1204 (Vin) may increase to about 270V. At the same time, the inrush current may quickly increase to about 150 Amps (A).

Figure 13:
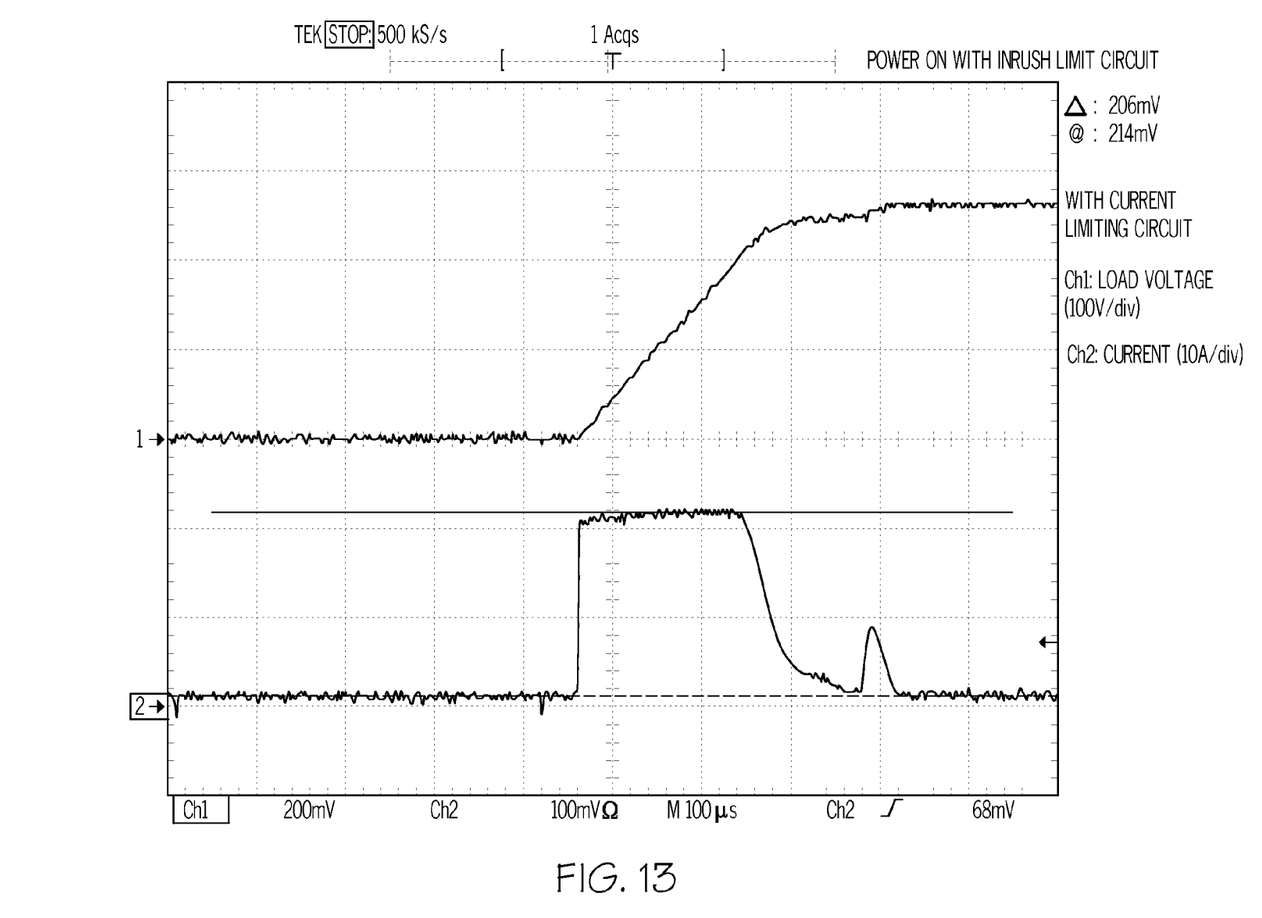
FIG. 13 is a graph of the inrush current limiting performance of one embodiment of the invention.

FIG. 13 is a graph 1300 showing load voltage and inrush current at power-on with inrush current limiting in accordance with one embodiment of the present invention. In particular, the graph 1300 shows the inrush current 1302 and the load voltage 1304 for one implementation of the DC power supply circuit 1000 shown in FIG. 10, with inrush current limiting circuit 1002. In this implementation the DC power supply circuit 1000 may be a 270V system, where the input voltage range may be about 180V to 350V and the temperature range may be about −40° C. to 125° C. Graph 1300 shows that at power-on, the load voltage 1304 may increase to about 270V. At the same time, the input current may be limited to about 21 A.

Figure 14:
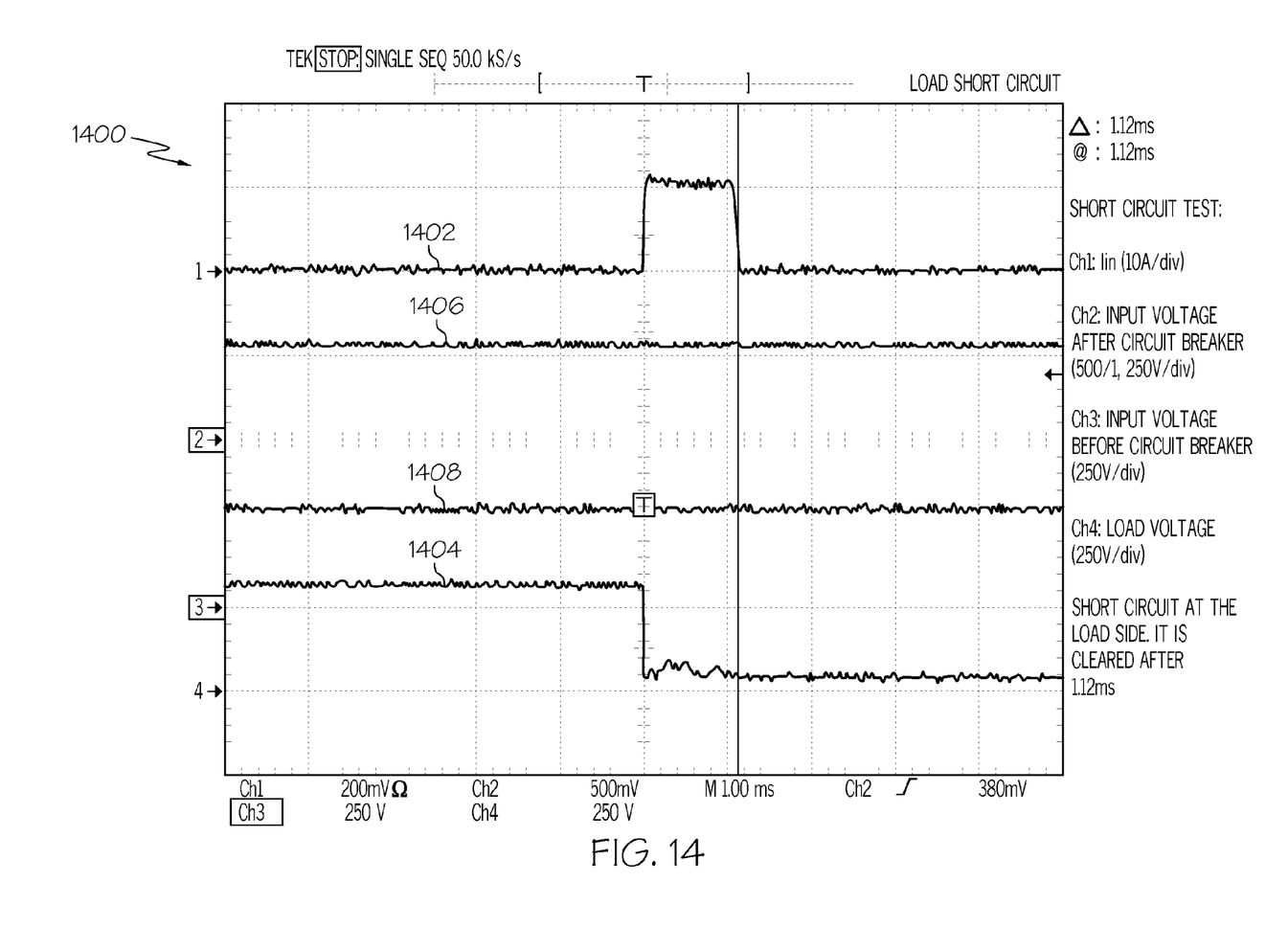
FIG. 14 is a graph of the short circuit protection performance of one embodiment of the invention.

FIG. 14 is a graph 1400 showing the short circuit protection function in accordance with one embodiment of the present invention. In particular, the graph 1400 shows the input current 1402 during a short circuit test for one implementation of the DC power supply circuit 1000 shown in FIG. 10. In this implementation, the DC power supply circuit 1000 may be a 270V system, where the input voltage range may be about 180V to 350V and the temperature range may be about −40° C. to 125° C. Graph 1400 shows that at the beginning of the short circuit test, the load voltage 1404 may drop rapidly. At about the same time, the input current 1402 may increase rapidly. After about 1.12 ms, the input current may drop back to its pre-test level, thus effectively preventing damage to circuit components. The input voltage 1406 after the circuit breaker (not shown) and the input voltage 1408 before the circuit breaker is also shown. These voltages do not change during the short circuit test.

Figure 15:
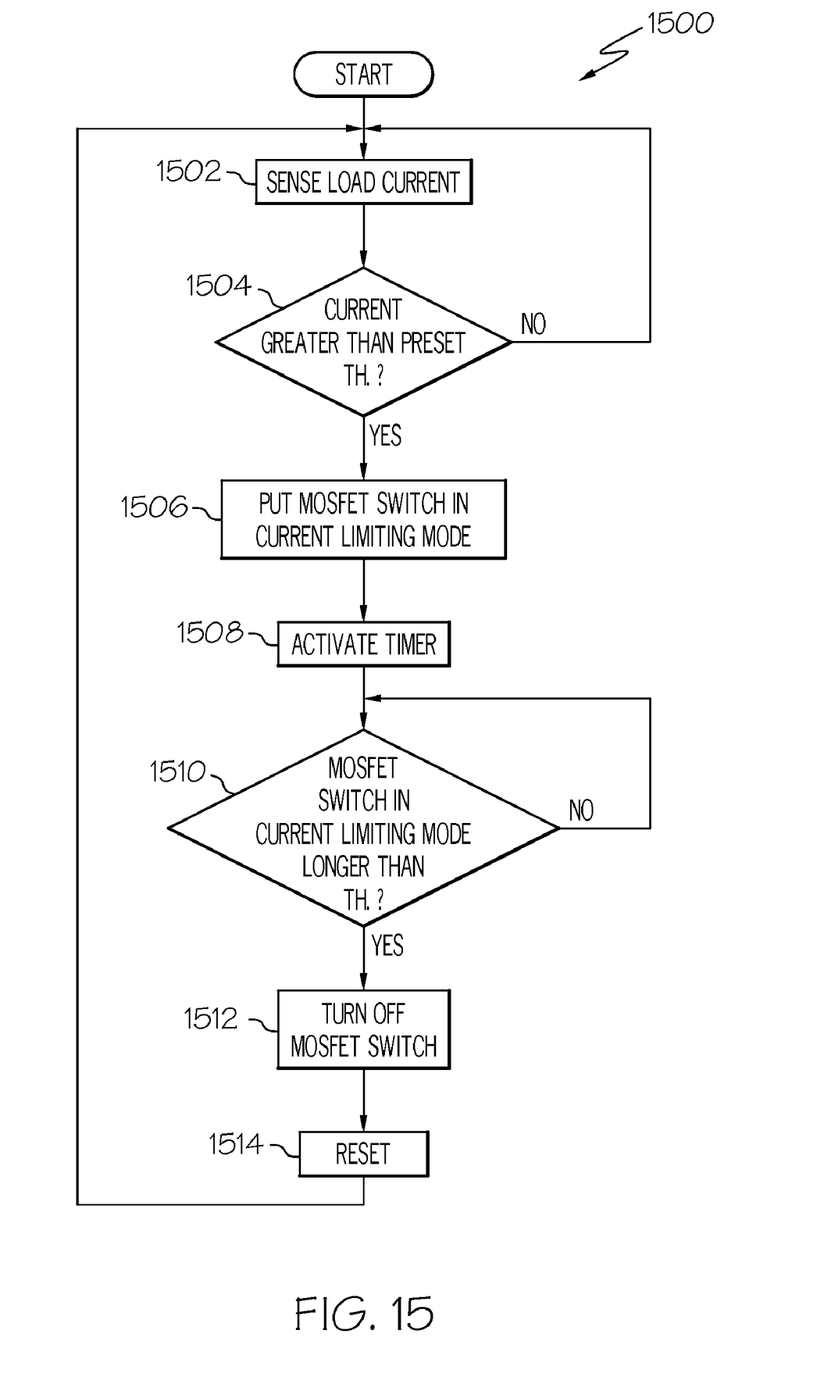
FIG. 15 is a flowchart of a method of inrush/transient current limiting and overload/short circuit protection in accordance with one embodiment of the invention.

FIG. 15 is a flow chart of a method of inrush/transient current limiting and overload/short circuit protection in accordance with one embodiment of the invention. The process 1500 may be employed using the circuit 800 shown in FIG. 8 in one embodiment of the invention. The process 1500 begins with sensing the load current in step 1502. This may be the voltage at the base of transistor 820. Decision step 1504 may determine if the sensed current is lower than a pre-set level. This level may be set by the electrical characteristics of transistor 820, such that transistor 820 may begin to turn on in its linear region when the load current reaches the pre-set level. If the preset level has not been reached, the process 1500 may return to step 1502. If instead the pre-set level has been reached, step 1506 may turn on transistor 820 which may cause the MOSFET switch 822 to operate in its current limiting state as it enters its linear mode. The effect of step 1506 may be to reduce the load current. This creates a feedback loop which may then cause transistor 820 to readjust its linear operation until a balance point will be reached.

In step 1508, a timer may be activated in response to the MOSFET switch 822 entering into its current limiting state. This may be the timer circuit 834. Step 1510 may then determine if the MOSFET switch 822 has been in its current limiting state for a predetermined period of time. If it has not, step 1510 may be repeated. If the predetermined period of time has been reached, step 1512 may cause the MOSFET switch 822 to turn off completely. This would occur, for example, in an overload, or a short circuit condition. The MOSFET switch 822 will remain off until it is reset in step 1514, whereupon the process 1500 may return to step 1502. In one embodiment of the invention, the predetermined period of time may be adapted to various load conditions, as provided by circuit 1001 shown in FIG. 10.

Thus, it may be seen that the present invention may provide DC power supplies with both inrush/transient current limit and overload/short circuit protection in a single circuit. The present invention may also be able to reliably perform these functions in applications where there is wide temperature and input voltage variation ranges. Also, the present invention may be able to adapt the short circuit turn-off timing based on short circuit conditions to extend the safe operating range of the DC power supply.

It should be understood, of course, that the foregoing relates to exemplary embodiments of the invention and that modifications may be made without departing from the spirit and scope of the invention as set forth in the following claims.

We claim:

1. A DC voltage power control circuit comprising:
   input terminals;
   output terminals;
   current limiting circuit operable to limit the amount of current delivered from said input terminals to said output terminals to a predetermined value, said operation of said current limiting circuit being temperature dependent;
   said current limiting circuit comprising:
      a sensor for sensing when said current delivered to said output terminal reaches a predetermined threshold;
      a first semiconductor switch operable to control said limiting of said amount of current delivered from said input terminals to said output terminals;
      a second semiconductor switch coupled to and controlling said current limiting state of said first semiconductor switch, wherein said control is temperature dependent; and
      wherein said current limiting circuit turns on said second semiconductor switch when said predetermined threshold is reached causing said first semiconductor switch to enter said current limiting state;
   compensation circuit coupled to one of said output terminals and to said current limiting circuit, said compensation circuit controlling said current limiting circuit in a manner that is temperature dependent, such that said temperature dependence of said current limiting circuit and said compensation circuit substantially cancel each other out;
   short circuit protection circuit coupled to said first semiconductor switch, said short circuit protection circuit being coupled to and controlling said off state of said first semiconductor switch;
   said short circuit protection circuit including a timer circuit generating a signal after said first semiconductor switch has been in said current limiting state for a predetermined period of time;
   said short circuit protection circuit responding to said timer circuit signal by causing said first semiconductor switch to enter said off state; and
   said short circuit protection circuit comprises:
      a third semiconductor switch coupled to an RC network, said third semiconductor switch turning on in response to the state of the RC network after a predetermined period of time, said turning on of said third semiconductor switch causing said first semiconductor switch to turn off; and a fourth semiconductor switch, which turns on in response to said turning on of said third semiconductor switch, said turning on of said fourth semiconductor switch causing said first semiconductor switch to latch in an off state.

2. The DC voltage power control circuit of claim 1 wherein said compensation circuit comprises a Schottky diode and a resistor, the operation of said Schottky diode being temperature dependent.

3. The DC voltage power control circuit of claim 1 comprising short circuit turn off timing circuit coupled to said short circuit protection circuit, said short circuit turn off timing circuit causing said timer circuit to speed up the timing of said generation of said signal in a short circuit condition.

4. A protection circuit for limiting the amount of electrical power delivered from a power source to a load, said protection circuit comprising:
input terminals;
output terminals;
first semiconductor switch coupled to one of said output terminals, and having a current limiting state, a non-current limiting state, and an off state;
current limiting circuit for limiting the amount of current delivered from said input terminals to said output terminals to a predetermined value by controlling said first semiconductor switch;
short circuit protection circuit coupled to said first semiconductor switch, said short circuit protection circuit being coupled to and controlling said off state of said first semiconductor switch;
said short circuit protection circuit includes a third semiconductor switch coupled to an RC network, said third semiconductor switch turning on in response to the state of the RC network after a predetermined period of time, said turning on of said third semiconductor switch causing said first semiconductor switch to turn off; and
wherein said short circuit protection circuit includes a fourth semiconductor switch, which turns on in response to said turning on of said third semiconductor switch said turning on of said fourth semiconductor switch causing said first semiconductor switch to latch in an off state.

5. The protection circuit of claim 4 wherein said current limiting circuit causes said first semiconductor switch to enter said current limiting state when said current delivered from said input terminals to said output terminals reaches a predetermined threshold.

6. The protection circuit of claim 5 wherein said short circuit protection circuit includes a timer circuit generating a signal after said first semiconductor switch has been in said current limiting state for a predetermined period of time, and said short circuit protection circuit responding to said timer circuit signal by causing said first semiconductor switch to enter said off state.

7. The protection circuit of claim 6 wherein said current limiting circuit includes a second semiconductor switch coupled to and controlling said current limiting state of said first semiconductor switch.

8. The protection circuit of claim 7 wherein said current limiting circuit includes a sensor for sensing when said current delivered from said input terminals to said output terminal reaches a predetermined threshold, said current limiting circuit turning on said second semiconductor switch when said threshold is reached, thereby causing said first semiconductor switch to enter said current limiting state.

9. The protection circuit of claim 8 wherein said timer circuit includes a resistor and capacitor (RC) network for determining said predetermined period of time.

10. A DC voltage power supply comprising:
input terminals;
output terminals;
first semiconductor switch coupled to one of said output terminals, said first semiconductor switch having a current limiting state, a non-current limiting state, and an off state;
short circuit protection circuit coupled to and controlling said off state of said first semiconductor switch;
said short circuit protection circuit including a timer circuit generating a signal after said first semiconductor switch has been in said current limiting state for a predetermined period of time;
said short circuit protection circuit responding to said timer circuit signal by causing said first semiconductor switch to enter said off state;
short circuit turn-off timing circuit coupled to said short circuit protection circuit, said short circuit turn-off timing circuit causing said timer to speed up the timing of said generation of said signal in a short circuit condition;
said short circuit protection circuit includes a second semiconductor switch coupled to an RC network, said second semiconductor switch turning on in response to the state of the RC network after a predetermined period of time, said turning on of said second semiconductor switch causing said first semiconductor switch to turn off; and
wherein said short circuit protection circuit includes a third semiconductor switch, which turns on in response to said turning on of said second semiconductor switch, said turning on of said third semiconductor switch causing said first semiconductor switch to latch in an off state.

11. The DC power supply of claim 10 wherein said short circuit turn-off timing circuit further comprises a resistor the value of which determines the degree to which said timer speeds up.

12. The DC power supply of claim 11 wherein said short circuit turn-off timing circuit further comprises a Zener diode the parameters of which set a threshold which said sensed voltage must exceed before said short circuit turn-off timing circuit speeds up said timer circuit.

13. The DC power supply of claim 10, wherein said short circuit turn-off timing circuit includes a sensor for sensing a voltage of said first semiconductor switch, said short circuit timing circuit coupling said sensed voltage to said timer circuit, such that in a short circuit condition, said sensed voltage causes said timer to speed up the timing of said generation of said signal.

14. The DC power supply of claim 10 further comprising:
current limiting circuit for limiting the amount of current delivered from said input terminals to said output terminals to a predetermined value, said current limiting circuit including a fourth semiconductor switch coupled to and controlling said current limiting state of said first semiconductor switch; and
said current limiting circuit including a sensor for sensing when said current delivered to said output terminal reaches a predetermined threshold, wherein said current limiting circuit turns on said fourth semiconductor switch when said threshold is reached causing said first semiconductor switch to enter said current limiting state.

15. The DC power supply of claim 14, wherein the operation of said fourth semiconductor switch is dependant on input voltage and temperature variations, and further comprising a compensation circuit coupled to one of said output terminals and to said fourth semiconductor switch, said compensation circuit affecting said sensed current to a degree that is dependent on temperature and input voltage variations, wherein said temperature and input voltage dependence of said fourth semiconductor switch and said compensation circuit substantially cancel each other out.

* * * * *